United States Patent [19]
Jang

[11] Patent Number: 6,043,697
[45] Date of Patent: Mar. 28, 2000

[54] CLOCK SIGNAL CONTROL APPARATUS FOR DATA OUTPUT BUFFER

[75] Inventor: Seong-Jin Jang, Seoul, Rep. of Korea

[73] Assignee: LG Semicon Co., Ltd., Cheongju, Rep. of Korea

[21] Appl. No.: 09/039,337

[22] Filed: Mar. 16, 1998

[30] Foreign Application Priority Data

Mar. 22, 1997 [KR] Rep. of Korea ............ 97/9982

[51] Int. Cl.⁷ ........................................... G11C 7/00
[52] U.S. Cl. ............................ 327/299; 365/233
[58] Field of Search .................. 327/291, 294–297, 327/299; 326/28; 365/233

[56] References Cited

U.S. PATENT DOCUMENTS

| | | | |
|---|---|---|---|
| 5,532,961 | 7/1996 | Mori et al. ................. | 365/189.05 |
| 5,627,794 | 5/1997 | Lee ........................... | 365/233 |
| 5,687,134 | 11/1997 | Sugawara et al. ........ | 365/233 |
| 5,764,584 | 6/1998 | Fukiage et al. ............ | 365/230.03 |
| 5,815,462 | 9/1998 | Konishi et al. ............ | 365/233 |
| 5,844,846 | 12/1998 | Jang ........................... | 365/189.05 |

*Primary Examiner*—Tuan T. Lam
*Attorney, Agent, or Firm*—Fleshner & Kim

[57] ABSTRACT

A clock signal control apparatus for a data output buffer that controls a data access time and an output signal maintaining time of the data output buffer based on a period of an input first clock signal. The apparatus includes a clock signal generator for generating a second clock signal having a period controlled by a period of a first clock signal, a clock signal controller and a data output buffer. The clock signal controller delays the second clock signal from the clock signal generator for a predetermined time, generates an output enable signal and a third clock signal in accordance with the second clock signal. A data output buffer receives a data signal, buffers the data signal in accordance with the third clock signal and the output enable signal from the clock signal controller, and generates an output data signal. The second clock signal has one of a plurality of periods based on the first clock signal.

20 Claims, 7 Drawing Sheets

CLOCK

FIG. 3B
BACKGROUND ART

CLKDO

FIG. 3C
BACKGROUND ART

OUTPUT_b

FIG. 3D
BACKGROUND ART

DATA

FIG. 3E
BACKGROUND ART

OUTPUT

CLOCK SIGNAL CONTROL APPARATUS FOR DATA OUTPUT BUFFER

BACKGROUND OF THE INVENTION

1. Field of the Invention

The present invention relates to a data output buffer, and in particular, to a clock signal control apparatus for a data output buffer.

2. Background of the Related Art

Figure 1:
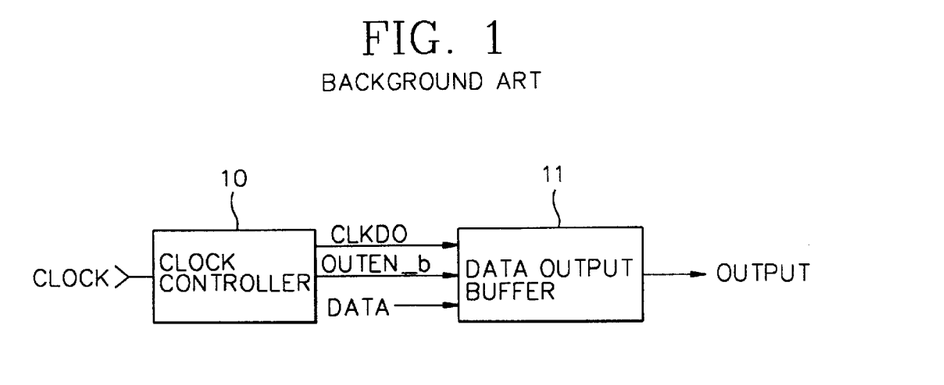
FIG. 1 is a block diagram illustrating a related art clock signal control apparatus.

As shown in FIG. 1, a related art clock signal control apparatus includes a clock controller 10 and a data output buffer 12. The clock controller delays an inputted clock signal CLOCK for a predetermined time and generates a clock signal CLKDO and an output enable signal OUTEN_b. The data output buffer 11 receives a data DATA, buffers the data DATA in accordance with the clock signal CLKDO and the output enable signal OUTEN_b, and generates an output signal OUTPUT.

Figure 2:
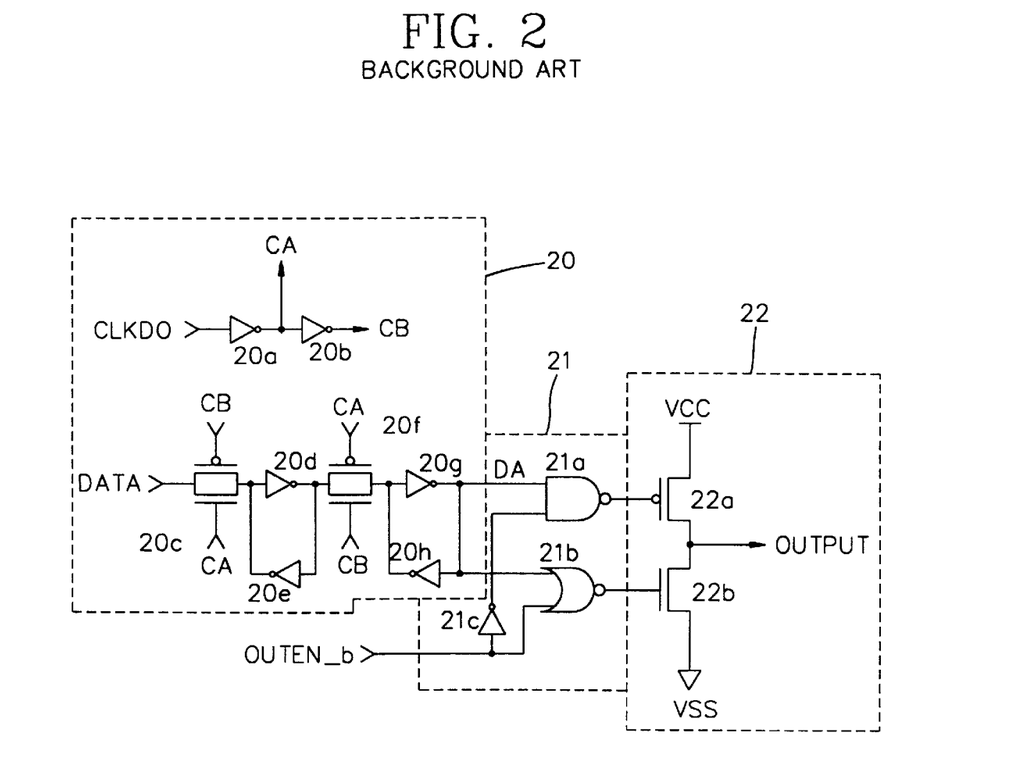
FIG. 2 is a circuit diagram illustrating a data output buffer of FIG. 1.

As shown in FIG. 2, the data output buffer 11 includes a data latch unit 20 for latching the data DATA at a rising edge of the clock signal CLOCK, an output enable unit 21 for determining the output of the data DATA from the data latch unit 20 in accordance with the output enable signal OUTEN_b and an output driving unit 22. The output driving unit 22 is driven by the output signal from the output enable unit 21 to generate the output signal OUTPUT.

The data latch unit 20 includes an inverter 20a for inverting the clock signal CLKDO to generate a clock signal CA, an inverter 20b for inverting the clock signal CA from the inverter 20a to generate a clock signal CB and a transmission gate 20c for passing the data DATA in accordance with the clock signal CB from the inverter 20b and the clock signal CA from the inverter 20a. Reverse-connected parallel inverters 20d and 20e are for latching the output signal from the transmission gate 20c. A transmission gate 20f is for switching the output signal from the inverter 20d in accordance with a clock signal CA and a clock signal CB. Inverters 20g and 20h are for sequentially inverting the output signal from the transmission gate 20f.

The output enable unit 21 includes an inverter 21c for inverting the output enable signal OUTEN_b. A NAND-gate 21a NANDs the output signal from the inverter 21c and the output signal from the inverter 20g of the data latch unit 20. A NOR-gate 21b NORs the output enable signal OUTEN_b and the output signal from the inverter 20g of the data latch unit 20.

The output driving unit 22 includes a PMOS transistor 22a having a gate that receives the output signal from the NAND-gate 21a of the output enable unit 21, a source that receives a power supply voltage VCC, and a drain that generates the output signal OUTPUT. An NMOS transistor 22b has a drain coupled to the drain of the PMOS transistor 22a, a gate that receives the output signal from the NOR-gate 21b of the output enable unit 21, and a source coupled to a ground voltage VSS.

A plurality of data output buffers 11 are provided in a dynamic random access memory (DRAM). Each data output buffer 11 receives an allocated data signal and is controlled in accordance with the output enable signal OUTEN_b and the clock signal CLKDO.

Figure 3A:
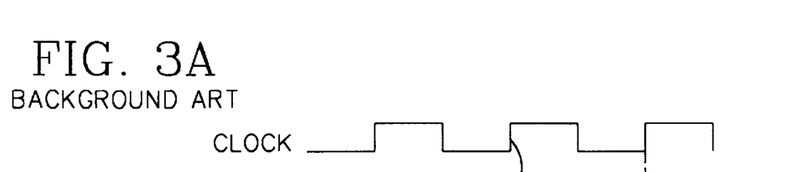
FIG. 3A is a diagram showing a clock signal timing waveform of the clock signal control apparatus in FIG. 1.
Figure 3B:
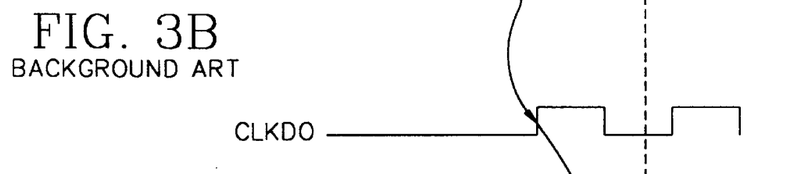
FIG. 3B is a diagram showing a delayed clock signal timing waveform of the output buffer in FIG. 2.
Figure 3C:
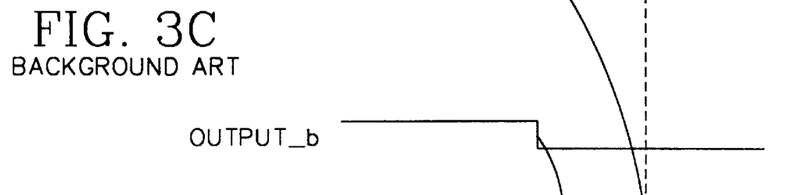
FIG. 3C is a diagram showing an output enable signal of the data output buffer in FIG. 2.
Figure 3D:
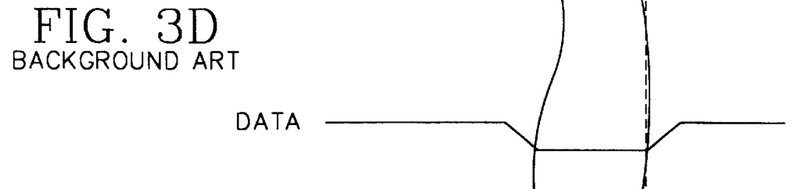
FIG. 3D is a diagram showing a data signal timing waveform of the data output buffer in FIG. 2.

The operation of the related art clock signal controller 10 and data output buffer 11 will now be described. The clock controller 10 delays the clock signal CLOCK shown in FIG. 3A for a predetermined time and outputs the delayed clock signal CLKDO as shown in FIG. 3B to the data output buffer 11. At this time, the clock controller 10 outputs the output enable signal OUTEN_b, as shown in FIG. 3C, to the output enable unit 21 of the data output buffer 11. In addition, when the delayed clock signal CLKDO is low level, the transmission gate 20c turns on and the data DATA shown in FIG. 3D is passed through the transmission gate 20c and is latched by the inverters 20d and 20e. As shown in FIG. 3C, when the output enable signal OUTEN_b is transited to a low level, the NAND-gate 21a of the output enable unit 21 converts its output signal from a high impedance low state to a high state as the high state data DATA latched by the inverters 20g and 20h is transmitted to the output driving unit 22.

When the delayed clock signal CLKDO is transited to a high level after the output enable signal OUTEN_b is transited to a low level, the transmission gate 20c is turned off, and the transmission gate 20f is turned on. Thus, the data DATA latched by the inverters 20d and 20e is latched by the inverters 20g and 20h, which changes the level of the output of the inverter 20g to a low level.

Therefore, as the outputs from the NAND-gate 21a and the NOR-gate 21b become high level, the PMOS transistor 22a is turned off, and the NMOS transistor 22b is turned on. Accordingly, the output OUTPUT becomes a low level. Thus, the output driving unit 22 buffers the data DATA.

Figure 3E:
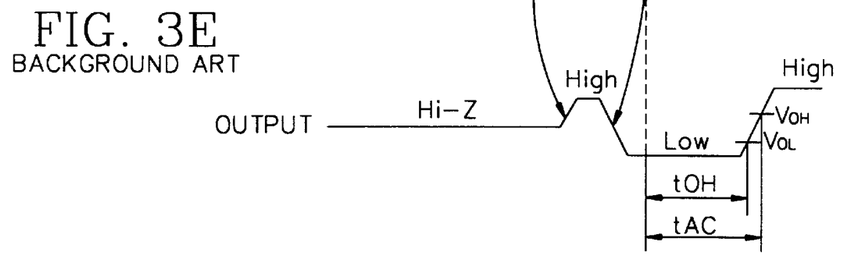
FIG. 3E is a diagram showing an output signal timing waveform of the data output buffer in FIG. 2.

However, the related art clock signal control apparatus has various disadvantages. The related art data output buffer 11 sets the maintaining time of the output signal OUTPUT to be shorter by about 1~2 ns than the data access time tAC in order to satisfy the data access time tAC by the clock signal CLOCK of a high frequency. As shown in FIG. 3E, $V_{OH}$ is an output high voltage and $V_{OL}$ is an output low voltage. Thus, the tOH is the time from the rising edge of the clock pulse to when the output voltage goes low (e.g., $V_{OL}$). The tAC is the time from the rising edge of the clock pulse to when the output voltage goes high (e.g., $V_{OH}$. However, the maintaining time tOH is not changed even though the frequency of the clock signal CLOCK is lowered. Thus, even when the memory is driven by a low frequency clock signal CLOCK, the margin with respect to the latch time of the data DATA is not improved compared to the high frequency clock signal CLOCK. In addition, in the related art data output buffer 11, it is not possible to satisfy the condition of the data access time tAC by using a clock signal CLOCK of a predetermined high frequency.

SUMMARY OF THE INVENTION

An object of the present invention to provide a clock signal control apparatus for a data output buffer that overcomes at least the aforementioned problems in the related art.

Another object of the present invention is to provide a clock signal control apparatus for a data output buffer that controls at least one of a data access time and an output signal time of the data output buffer based on a period of an inputted clock signal.

To achieve at least the above objects in a whole or in parts, there is provided a clock signal control apparatus for a data output buffer according to the present invention that includes a clock signal generator for receiving a first clock signal and generating a second clock signal CLKD having a period controlled by the period of the first clock signal CLOCK, a clock signal controller for delaying the second clock signal from the clock signal generator for a predetermined time to generate a third clock signal CLKDO and an output enable signal, and a data output buffer that receives an input data signal and buffers the received input data signal in accordance with the third clock signal and the output enable signal to generate an output data signal.

To further achieve the above objects, there is provided a clock signal control apparatus for a data output buffer that includes an output buffer to buffer an input data, including a clock signal generator that receives a first clock signal and generates a plurality of second clock signals having a period based on a period of the first clock signal, and a clock signal controller that delays a selected one of the plurality of second clock signals from the clock signal generator for a predetermined time to generate a third clock signal and an output enable signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
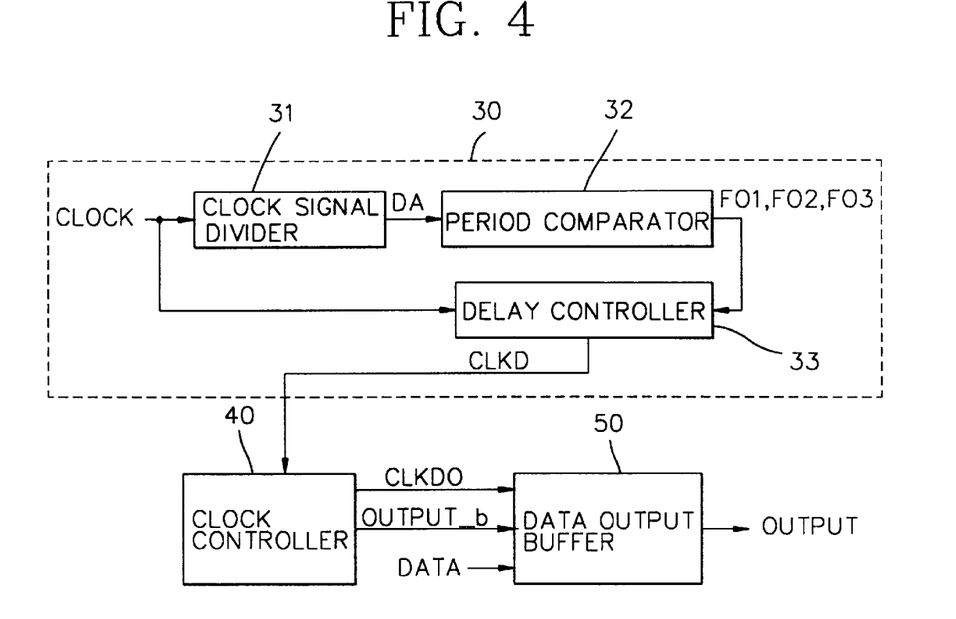
FIG. 4 is a block diagram illustrating a preferred embodiment of a clock signal control apparatus for a data output buffer according to the present invention.

As shown in FIG. 4, a preferred embodiment of a clock control apparatus for a data output buffer according to the present invention includes a clock signal generator 30 for dividing and delaying an inputted delayed clock signal CLOCK to generate a clock signal CLKD. A clock signal controller 40 delays the clock signal CLKD from the clock signal generator 30 for a predetermined time and generates a clock signal CLKDO and an output enable signal OUTEN_b. A data output buffer 50 receives input data DATA, buffers the data DATA in accordance with the delayed clock signal CLKDO and the output enable signal OUTEN_b, and outputs an output signal OUTPUT.

The clock signal generator 30 includes a clock signal divider 31 for doubling the period of the clock signal CLOCK and outputting a clock signal DA. A period comparator 32 detects the clock signal DA from the clock signal divider 31 and generates clock signals F01, F02, and F03. A delay controller 33 delays the clock signal CLOCK in accordance with the clock signals F01, F02, and F03 from the period comparator 32 and outputs the clock signal CLKD to the clock controller 40.

Figure 5:
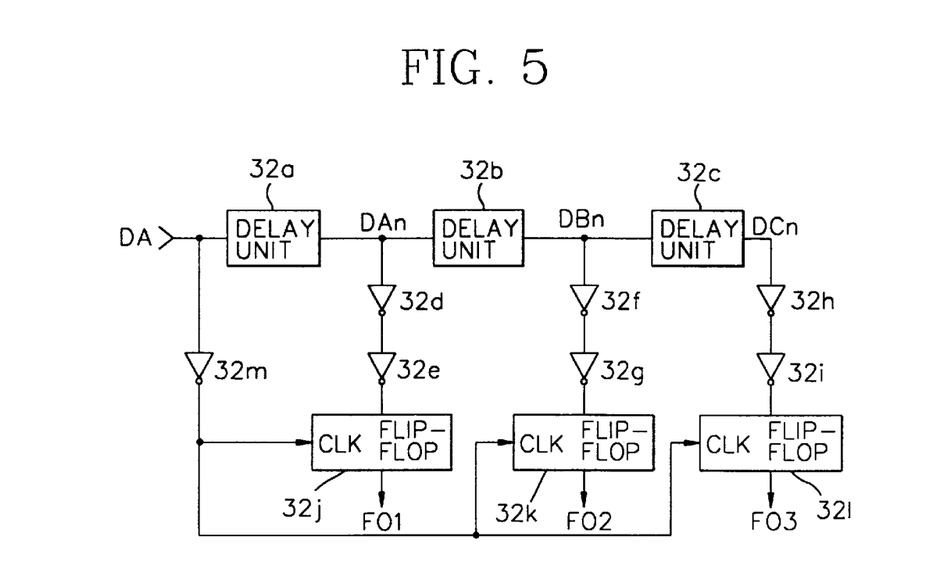
FIG. 5 is a block diagram illustrating a period comparator of FIG. 4.

As shown in FIG. 5, the period comparator 32 includes a first delay unit 32a for delaying the clock signal DA from the clock signal divider 31 to output a once-delayed clock signal DAn and an inverter 32m for inverting the clock signal DA. A second delay unit 32b further delays the once-delayed clock signal DAn from the delay unit 32a to output a twice-delayed clock signal DBn. A third delay unit 32c further delays the twice-delayed clock signal DBn from the delay unit 32b to output a thrice-delayed clock signal DCn.

Series inverters 32d and 32e sequentially invert the once-delayed clock signal DAn from the delay unit 32a and a flip-flop unit 32j latches the output signal from the inverter 32e in accordance with the output signal from the inverter 32m received at a clock input to output the clock signal F01. Series inverters 32f and 32g for sequentially invert the twice-delayed clock signal DBn from the delay unit 32b and a flip-flop unit 32k latches the output signal from the inverter 32g in accordance with the output signal from the inverter 32m received at a clock input to output the clock signal F02. Series inverters 32h and 32i sequentially invert the thrice-delayed signal DCn from the delay unit 32c and a flip-flop unit 32l latches the output signal from the inverter 32i in accordance with the output signal from the inverter 32m received at a clock input to output the clock signal F03.

Figure 6:
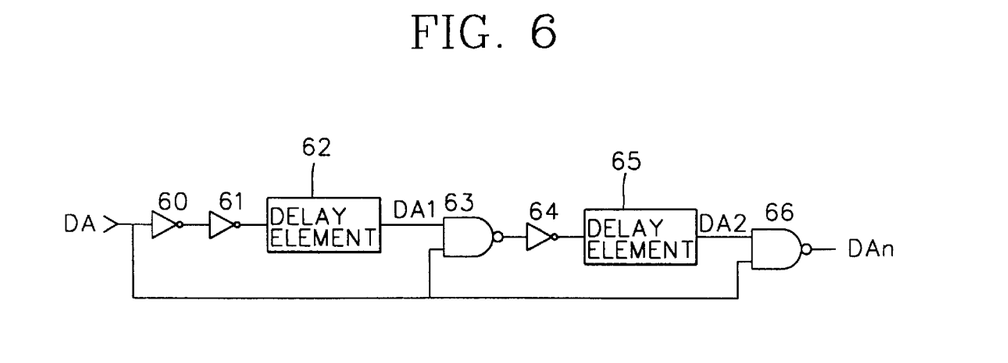
FIG. 6 is a block diagram illustrating a delay unit of FIG. 5.

As shown in FIG. 6, the delay unit 32a of the period comparator 32 includes series inverters 60 and 61 for sequentially inverting the clock signal DA from the clock signal divider 31. A first delay element 62 delays the output signal from the inverter 61 to output a clock signal DA1. An NAND-gate 63 NANDs the clock signal DA1 from the delay element 62 and the clock signal DA. An inverter 64 inverts the output signal from the NAND-gate 63. A second delay element 65 delays the output signal from the inverter 64 and to output a clock signal DA2 and a NAND-gate 66 NANDs the output from the delay element 65 and the clock signal DA. The delay units 32b and 32c are similar to the delay unit 32a. Accordingly, a detailed description is omitted. However, the delay units 32 band 32c can have delay times different from each other and the delay unit 32a.

Figure 7:
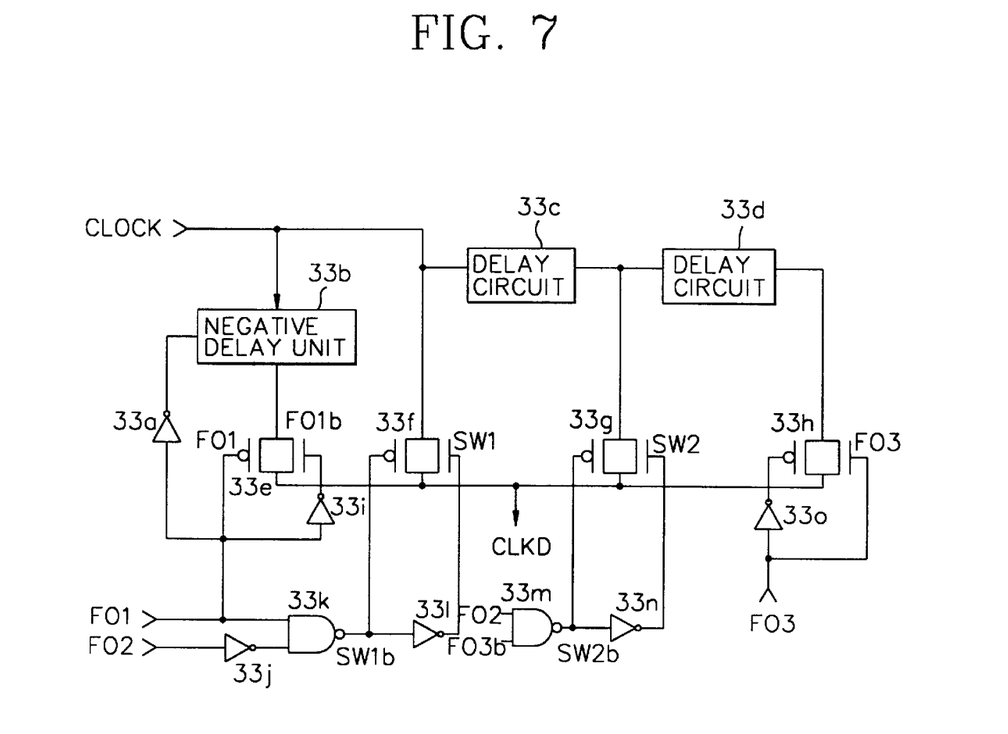
FIG. 7 is a circuit diagram illustrating a delay controller of FIG. 4.

As shown in FIG. 7, the delay controller 33 of the clock signal generator 30 includes an inverter 33a for inverting the clock signal F01 from the period comparator 32 to output an enable signal EN and a negative delay unit 33b for negatively delaying the clock signal CLOCK in accordance with the enable signal EN from the inverter 33a. Delay circuits 33c and 33d sequentially delay the clock signal CLOCK. A transmission gate 33e switches the output signal from the negative delay unit 33b in accordance with complementary clock signals F01 and F01b to output a clock signal CLKD. A transmission gate 33f switches the clock signal CLOCK in accordance with complementary clock signals SW1 and SW1b and a transmission gate 33g switches the output signal from the delay circuit 33c in accordance with complementary clock signals SW2 and SW2b to output the clock signal CLKD. A transmission gate 33h switches the output signal from the delay circuit 33d in accordance with complementary clock signals F03 and F03b to output the clock signal CLKD.

The delay controller 33 further includes an inverter 33i for inverting the clock signal F01 from the period comparator 32 to generate the clock signal F01b. An inverter 33j inverts the clock signal F02 from the period comparator 32 to output the clock signal F02b. A NAND-gate 33k NANDs the output signal from the inverter 33j and the clock signal F01 to output the clock signal SW1b. An inverter 33l inverts the output signal from the NAND-gate 33k to generate the clock signal SW1. A NAND-gate 33m NANDs the clock signals F02 and F03b to generate the clock signal SW2b and an inverter 33n inverts the clock signal SW2b to generating the clock signal SW2. An inverter 33o inverts the clock signal F03 to generate the clock signal F03b.

Figure 8A:
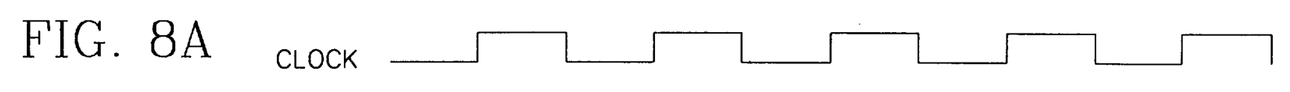
FIG. 8A is a diagram showing a clock signal timing waveform of a clock signal divider.
Figure 8B:
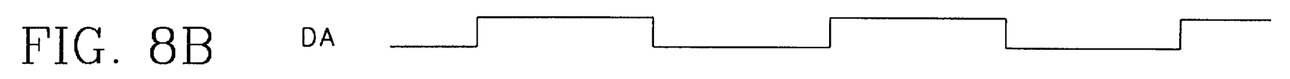
FIG. 8B is a diagram illustrating a divided clock signal timing waveform of FIG. 4.

Operations of the preferred embodiment of the clock signal control apparatus for a data output buffer will now be described. The clock signal divider 31 receives the clock signal CLOCK as shown in FIG. 8A and divides the signal frequency by one-half. The clock signal divider 31 outputs the divided clock signal DA as shown in FIG. 8B to the period comparator 32.

Figure 8C:
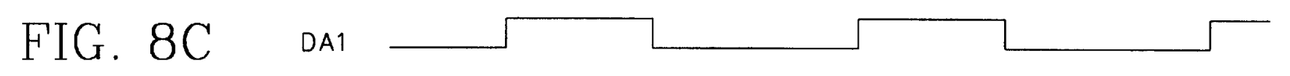
FIGS. 8C through 8E are diagrams showing signal timing waveforms from a delay element of FIG. 6.
Figure 8D:
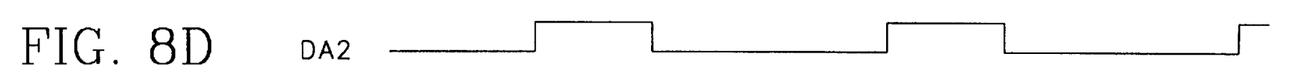
Figure 8E:
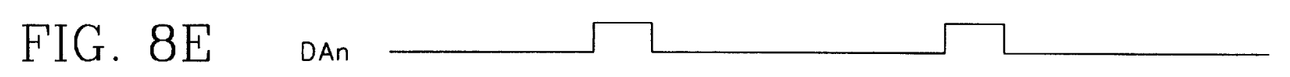
Figure 8F:
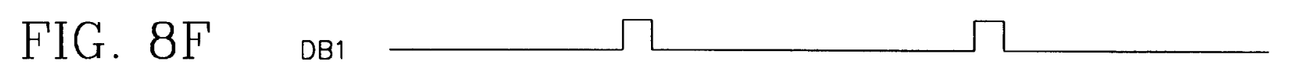
FIGS. 8F and 8G are diagrams showing signal timing waveforms from a delay unit of FIG. 5.
Figure 8G:
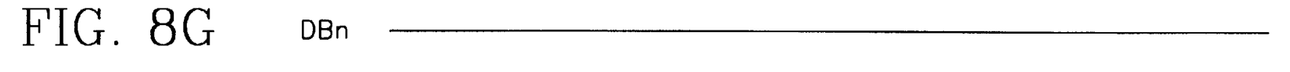

The period comparator 32 delays the received clock signal DA and outputs clock signals DA1 through DAn as respectively shown in FIGS. 8C through 8E and clock signals DB1 through DBn as respectively shown in FIGS. 8F and 8G. The clock signals DA1 through DAn are generated by the delay unit 32a as shown in FIG. 6. On the assumption that the delay period provided by the delay unit 32a of the period comparator 32 is P1, the delay period provided by the delay unit 32b is P2, and the delay period provided by the delay unit 32c is P3, the levels of the clock signals F01 through F03 are determined in accordance with the period of the clock signal DA and the difference in the delay periods P1 through P3.

Figure 8H:
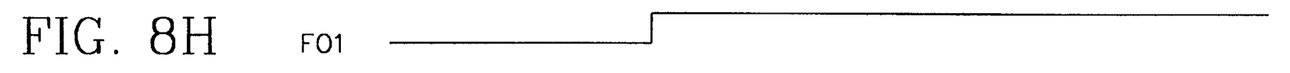
FIGS. 8H through 8J are diagrams showing signal timing waveforms from a period comparator of FIG. 5.
Figure 8I:
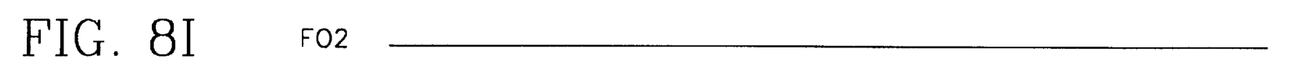
Figure 8J:
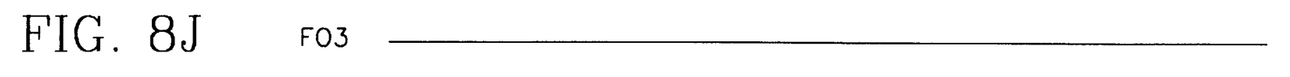

For example, if the period of the clock signal DA is longer than the delay period P1 and is shorter than the delay period P2, the clock signal DAn is maintained at a high level for as much as the time corresponding to the difference between the high level period of the clock signal DA and the delay period P1. When the clock signal DA is transited to a low level, the clock signal DA2 is transited to a low level by the NAND-gates 63 and 66 as shown in FIG. 6. Thereby, the clock signal DAn is transited to a low level as shown in FIG. 5. Accordingly, the clock signals DBn and DCn maintain a low level. When the clock signal DA is transited to a low level, the flip-flop unit 32j latches the high level clock signal DAn and outputs a high level clock signal F01 as shown in FIG. 8H, and the flip-flop units 32k and 32L output low level clock signals F02 and F03 as shown in FIGS. 8I and 8J.

If the period of the clock signal DA is longer than the delay period P2 and is shorter than the delay period P3, the clock signals F01 and F02 become high level. However, the clock signal F03 becomes a low level.

If the period of the clock signal DA is longer than the delay period P3, the clock signals F01, F02 and F03 are all transited to high level. If the period of the clock signal DA is shorter than the delay period P1, the clock signals F01, F02 and F03 all become low level.

Referring to FIG. 7, when only the clock signal F01 is high level, the transmission gates 33e, 33g and 33h are turned off. The transmission gate 33f is turned on by signals SW1 and SW1b generated by the circuit including the inverter 33j, the NAND-gate 33k, and the inverter 33l. Thus, the clock signal CLOCK is outputted directly as the clock signal CLKD.

If the clock signals F01 and F02 are high levels, the transmission gates 33e, 33f, and 33h are turned off. The transmission gate 33g is turned on by signals SW2 and SW2b generated by the circuit including the NAND-gate 33m, the inverter 33n, and the clock signal CLOCK is delayed and outputted as the clock signal CLKD through the delay circuit 33c.

If the clock signals F01, F02 and F03 are high level, the transmission gates 33e, 33f, and 33g are turned off. The transmission gate 33h is turned on by the clock signal F03 and the complementary signal F03b generated by the inverter 33o. The clock signal CLOCK delayed by the delay circuits 33c and 33d is outputted as the clock signal CLKD.

If the clock signals F01, F02, and F03 are all low level, the transmission gates 33f, 33g, and 33h are all turned off. The transmission gate 33e is turned on by the signal F01 and its complement F01b generated by the inverter 33i. At this time, the negative delay unit 33b is operated by the high level enable signal EN from the inverter 33a. Thus, a signal faster than the clock signal CLOCK is outputted as the clock signal CLKD. In this manner, the clock signal generator 30 can output to the clock controller 40 the clock signal CLKD having a period that is controlled by the period of the clock signal CLOCK.

FIGS. 9A through 9E are diagrams of output signal timing waveforms from the data output buffer 50 when the clock signals F01, F02, and F03 are low level. FIGS. 10A through 10E are diagrams of output signal timing waveforms when the clock signals F01 and F02 are high level.

Figure 9A:
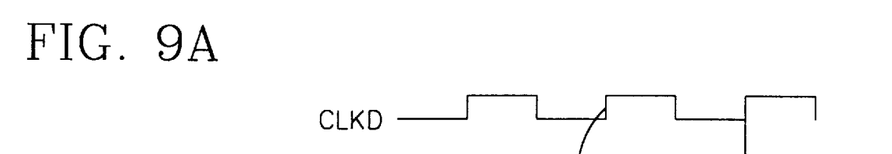
FIG. 9A is a diagram showing a clock signal timing waveform transmitted to a clock controller of FIG. 4.
Figure 9B:
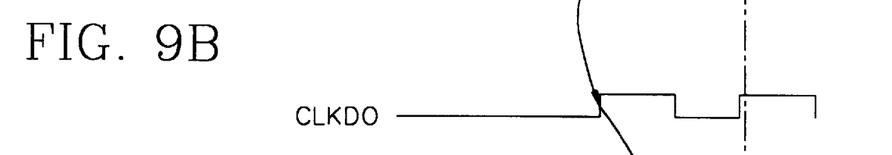
FIG. 9B is a diagram showing a clock signal timing waveform inputted into a data output buffer.
Figure 9C:
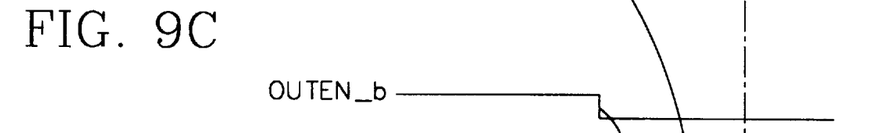
FIG. 9C is a diagram showing an output enable signal timing waveform inputted into a data output buffer.
Figure 9D:
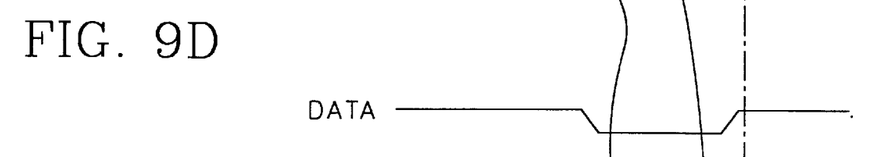
FIG. 9D is a diagram showing a data signal timing waveform inputted into a data output buffer.
Figure 9E:
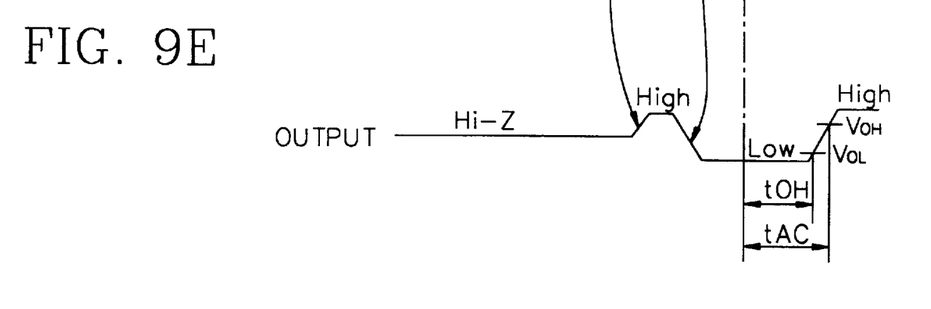
FIG. 9E is a diagram showing an output signal timing waveform from a data output buffer.
Figure 10A:
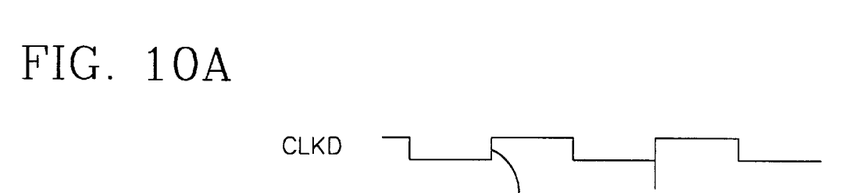
FIG. 10A is a diagram showing a clock signal timing waveform transmitted to a clock controller of FIG. 4.
Figure 10B:
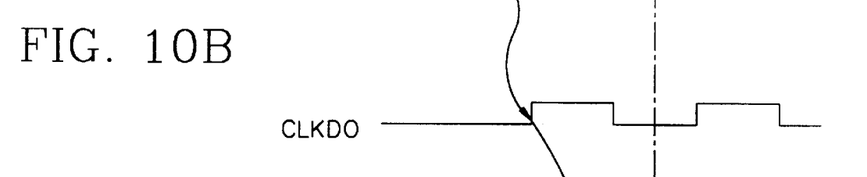
FIG. 10B is a diagram showing a clock signal timing waveform inputted into a data output buffer.
Figure 10C:
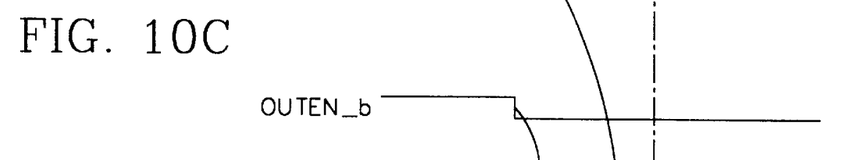
FIG. 10C is a diagram showing an output enable signal timing waveform inputted into a data output buffer.
Figure 10D:
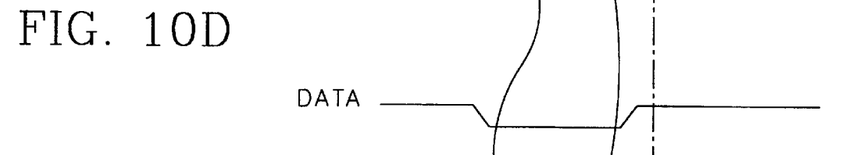
FIG. 10D is a diagram showing a data signal timing waveform inputted into a data output buffer.
Figure 10E:
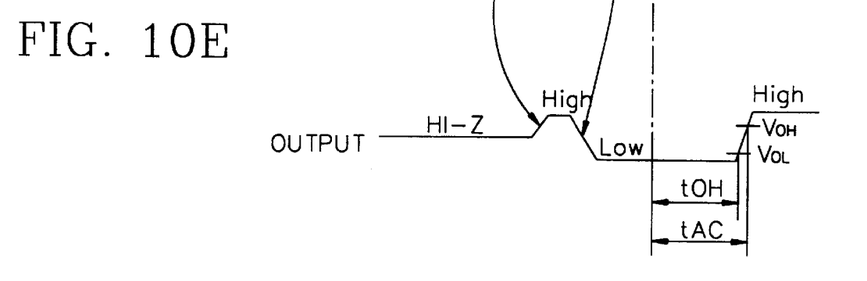
FIG. 10E is a diagram showing an output signal timing waveform from a data output buffer.

The clock controller 40 outputs the clock signal CLKDO as shown in FIG. 9B and FIG. 10B and the output enable signal OUTEN_b as shown in FIG. 9C and FIG. 10C to the data output buffer 50 in accordance with the inputted clock signal CLKD. As shown in FIGS. 9A through 9E, time periods until the output signal OUTPUT is outputted (e.g., the maintaining times tOH, and tAC of the output signal OUTPUT) are controlled by the clock signal CLOCK.

Similarly as shown in FIGS. 10A through 10E, the time periods (e.g., tOH and tAC) when the output signal OUTPUT is outputted are controlled by the clock signal CLOCK.

Since the time at which the output signal OUTPUT is outputted can be controlled based on the period of the clock signal CLOCK, the data access time tAC and the maintaining time tOH of the output signal OUTPUT are made variable in accordance with the period of the clock signal CLOCK.

Even though there are different periods in accordance with the latency time of a column address strobe signal of a synchronous DRAM (SDRAM), since the identical maintaining time tOH is needed, the clock signal generator 30 can include a circuit for controlling the latency time of the column address strobe signal.

As described above, the preferred embodiment of the clock signal control apparatus for a data output buffer according to the present invention controls the data access time of the data output buffer and the maintaining time of its output signal based on the inputted clock signal period. Thus, the preferred embodiment of the clock signal control apparatus has various advantages. When the memory is driven in accordance with a lower frequency clock signal, the maintaining time of the output signal is extended. Thus, the buffered data is fully output. When the memory is driven in accordance with a higher frequency clock signal, a faster data access time is obtained.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A data output buffer apparatus, comprising:
   a clock signal generator that receives a first clock signal and generates a second clock signal having a period based on a period of the first clock signal, wherein the clock signal generator comprises,
      a generator that generates a plurality of intermediate clock signals based on a period of the first clock signal, and
      a delay controller that delays the first clock signal based on the plurality of intermediate clock signals to output the second clock signal;
   a clock signal controller that delays the second clock signal from the clock signal generator for a predetermined time to generate a third clock signal and an output enable signal; and
   a data output buffer that receives a data signal and buffers the data signal based on the third clock signal and the output enable signal to generate an output signal.

2. The apparatus of claim 1, wherein the generator comprises:
   a clock signal divider that divides a frequency of the first clock signal; and
   a period comparator that detects a period of an output signal from the clock signal divider and generates the plurality of intermediate clock signals based on the detected output signal period of the clock signal divider.

3. The apparatus of claim 2, wherein the period comparator comprises:
   a first delay unit that delays the output signal from the clock signal divider;
   a second delay unit that delays an output signal from the first delay unit;
   a third delay unit that delays an output signal from the second delay unit;
   an inverter unit that inverts the output signal from the clock signal divider;
   a first latch unit that latches an output signal from the first delay unit based on an output signal from the inverter unit to output a first intermediate clock signal of the plurality of intermediate clock signals;
   a second latch unit that latches an output signal from the second delay unit based on the output signal from the inverter unit to output the a second intermediate clock signal; and
   a third latch unit that latches an output signal from the third delay unit based on the output signal from the inverter unit to output a third intermediate clock signal.

4. The apparatus of claim 3, wherein the first latch unit receives the output signal from the first delay unit through a first pair of inverters coupled in series, the second latch unit receives the output signal from the second delay unit through a second pair of inverters coupled in series, and the third latch unit receives the output signal from the third delay unit through a third pair of inverters coupled in series.

5. The apparatus of claim 3, wherein each of the first through third delay units comprise:
   a pair of inverters coupled in series to sequentially invert an inputted clock signal;
   a first delay element that delays an output signal from the pair of series inverters;
   a first logic-gate that logically processes an output signal from the first delay element and the inputted clock signal;
   an inverter that inverts an output signal from the first logic-gate;
   a second delay element that delays an output signal from the inverter; and
   a second logic-gate for that logically processes an output signal from the second delay element and the inputted clock signal.

6. The apparatus of claim 5, wherein the first and second logic-gates are NAND-gates, and wherein each of the first through third latch units is a flip-flop circuit.

7. The apparatus of claim 2, wherein the delay controller comprises:
   a negative delay unit that negatively delays the first clock signal;
   first and second delay units that sequentially delay the first clock signal;
   first transmission circuit that switches an output signal from the negative delay unit to output the second clock signal;
   a second transmission circuit that switches the first clock signal to output the second clock signal;
   a third transmission circuit that switches an output signal from the first delay unit to output the second clock signal; and
   a fourth transmission circuit that switches an output signal from the second delay unit to output the second clock signal.

8. The apparatus of claim 7, wherein the delay controller comprises an inverter for inverting one of the plurality of intermediate clock signals to output an enable signal to the negative delay unit.

9. The apparatus of claim 7, wherein the delay controller comprises:
   a first inverter that inverts a first intermediate clock signal from the period comparator and applies the inverted signal to the first transmission circuit;
   a second inverter that inverts a second intermediate clock signal from the period comparator;
   a first logic-gate for logically processing an output signal from the second inverter and the first intermediate clock signal and applying an output signal to the second transmission circuit;
   a third inverter that inverts the output signal from the first logic-gate and applies the inverted signal to the second transmission circuit;
   a fourth inverter that inverts a third intermediate clock signal from the period comparator and applies the inverted signal to the fourth transmission circuit;
   a second logic-gate for logically processing an inverse third intermediate clock signal and the second intermediate clock signal and applying an output signal to the third transmission circuit; and
   a fifth inverter that inverts the output signal from the second logic-gate and applies the inverted signal to the third transmission circuit.

10. The apparatus of claim 9, wherein each of the transmission circuits comprise a transmission gate, and wherein the first and second logic-gates are NAND-gates.

11. A clock signal control apparatus for a data output buffer that includes an output buffer to buffer an input data, comprising:
   a clock signal generator that receives a first clock signal and generates a plurality of second clock signals having a period based on a period of the first clock signal, wherein the clock signal generator delays the first clock signal based on each of the plurality of second clock signals to generate a plurality of delayed first clock signals, and wherein a selected one of the delayed first clock signals is output as a third clock signal; and
   a clock signal controller that delays the third clock signal for a predetermined time to generate a fourth clock signal and an output enable signal.

12. The apparatus of claim 11, wherein the output buffer receives the input data and buffers the input data based on the fourth clock signal and the output enable signal to generate an output signal.

13. The apparatus of claim 11, wherein the clock signal generator comprises:
   a clock signal divider that divides a frequency of the first clock signal; and
   a period comparator that detects a period of an output signal from the clock signal divider and generates the plurality of second clock signals based on the detected output signal period of the clock signal divider.

14. The apparatus of claim 13, wherein the period comparator comprises:
   a plurality of delay units that delay an output signal from the clock signal divider;
   an inverter unit that inverts the output signal from the clock signal divider;
   a plurality of latch units that latch a corresponding output from a corresponding one of the plurality of delay units based on an output signal from the inverter unit to output one of the plurality of second clock signals.

15. The apparatus of claim 14, wherein each of the plurality of delay units has a different delay period.

16. The apparatus of claim 13, wherein the clock signal generator further comprises a delay controller comprising:
   a negative delay unit that negatively delays the first clock signal;
   first and second delay units that sequentially delay the first clock signal;
   a plurality of transmission gates that transmit a corresponding one of at least the first clock signal, an output signal from the negative delay unit, an output signal from the first delay unit, an output signal from the second delay unit to output the third clock signal.

17. A data output buffer apparatus, comprising:
   a clock signal generator that receives a first clock signal and comprises a clock signal divider that divides a frequency of the first clock signal to generate a divided first clock signal, and wherein the clock signal generator generates a second clock signal based on a selected one of a plurality of variable width pulse signals based on the divided first clock signal;
   a clock signal controller that delays the second clock signal from the clock signal generator for a predetermined time to generate a third clock signal and an output enable signal; and
   a data output buffer that receives a data signal and buffers the data signal based on the third clock signal and the output enable signal to generate an output signal.

18. The apparatus of claim 17, wherein the clock signal generator comprises:
   a period comparator that detects a period of the divided first clock signal from the clock signal divider and generates the plurality of variable width pulse signals based on the detected period of the divided first clock signal.

19. The apparatus of claim 18, wherein the clock signal generator further comprises a delay controller that modifies the first clock signal based on the plurality of variable width pulse signals from the period comparator to output the second clock signal to the clock signal controller.

20. The apparatus of claim 19, wherein a maintaining time of the output signal increases as a frequency of the first clock signal decreases, and wherein a data access time decreases as the frequency of the first clock signal increases.

* * * * *